June 10, 1947.  S. BIZJAK  2,421,867
TRACTOR
Filed Oct. 27, 1944     2 Sheets-Sheet 1

STANLEY BIZJAK,
INVENTOR.

BY
ATTORNEY.

June 10, 1947.  S. BIZJAK  2,421,867
TRACTOR
Filed Oct. 27, 1944  2 Sheets-Sheet 2
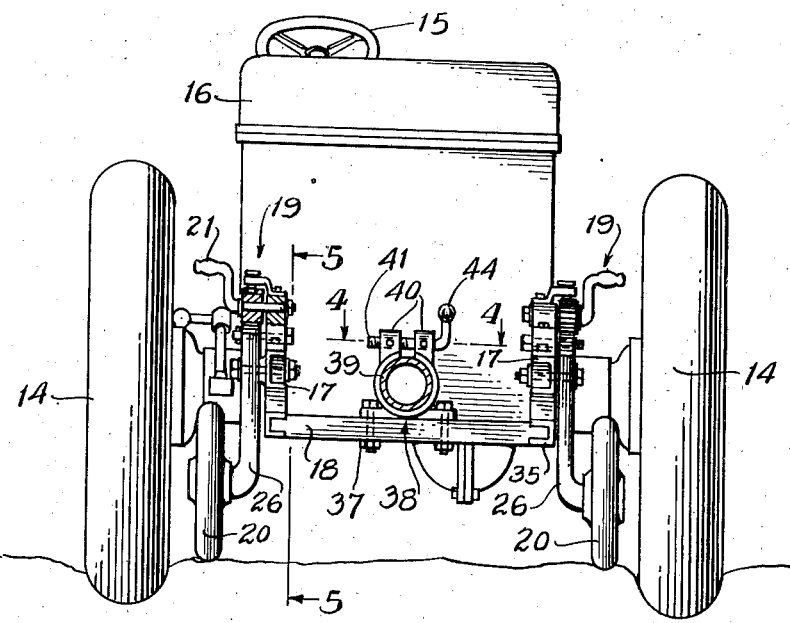
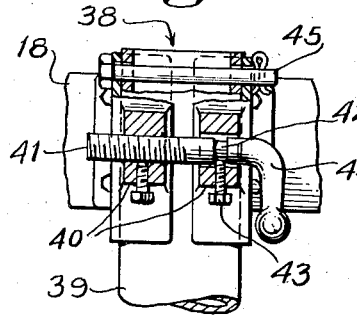
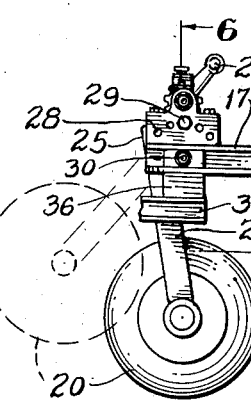
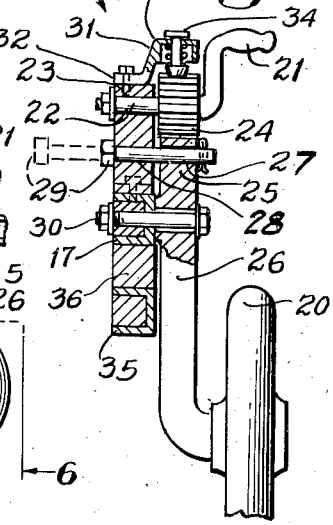
STANLEY BIZJAK,
INVENTOR.
BY
ATTORNEY.

Patented June 10, 1947

2,421,867

UNITED STATES PATENT OFFICE 2,421,867

TRACTOR

Stanley Bizjak, Crivitz, Wis.

Application October 27, 1944, Serial No. 560,529

4 Claims. (Cl. 180—12)

This invention relates to tractors and more particularly to a tractor embodying retractible mechanism whereby it may be propelled alone on four wheels or may be propelled on two wheels when hitched to a plow, harrow or other soil-working implements.

It is not infrequent that a farmer is desirous of disconnecting one agricultural implement from a tractor in order to connect another implement thereto. When there is no provision made for converting the tractor from a two wheel tractor to a four wheel tractor the farmer must bring the desired implement to within hitching distance of the unhitched tractor before the change-over can be accomplished. This is not at all feasible for obvious reasons. By employing a tractor embodying auxiliary mechanism whereby a two wheel tractor can be converted into a four wheel tractor the operator can unhitch and move the tractor to the desired spot where the implement to be hitched onto is located. After the change-over has been made a mechanism on the vehicle provided for the purpose can be operated to retract certain auxiliary ground wheels, thus converting the machine into a two wheeled vehicle for the purpose of traction only.

It is an object of the present invention to provide a general purpose farm tractor capable of use in the aforementioned capacity.

Further objects are: to provide a tractor which is built to get around close quarters and for pulling up close to a fence or the end of a plowed field; to provide a tractor wherein 85% of the weight can be distributed on a single axle to give more traction to the engine-driven ground wheels; and to provide in a tractor auxiliary wheels which can be more quickly adjusted to and from a ground-engaging position and which are lighter in construction, cheaper and easier to manufacture.

Other objects, advantages and features of invention will hereinafter appear.

Referring to the accompanying drawings, which illustrate what is at present deemed to be a preferred embodiment of the invention, Fig. 1 is a side elevation of the device, a fragmentary portion of the hitch pole being included in the view. The auxiliary ground wheels are shown in broken lines in their operative position and in full lines in their inoperative position.

Fig. 3 is a rear elevation of the device including the seat, some parts being broken away to illustrate certain mechanical details.

Fig. 4 is a fragmentary section in plan taken on line 4—4 of Fig. 3 showing the hitch mechanism.

Fig. 5 is a vertical fragmentary section indicated by line 5—5 in Fig. 3 showing the auxiliary wheel elevating mechanism, a dotted indication of the inoperative position of one of the auxiliary wheels being included in the view.

Fig. 6 is an enlarged vertical section of the structure shown in Fig. 5 partly in elevation and partly sectional on line 6—6 of the latter view.

Figure 1:
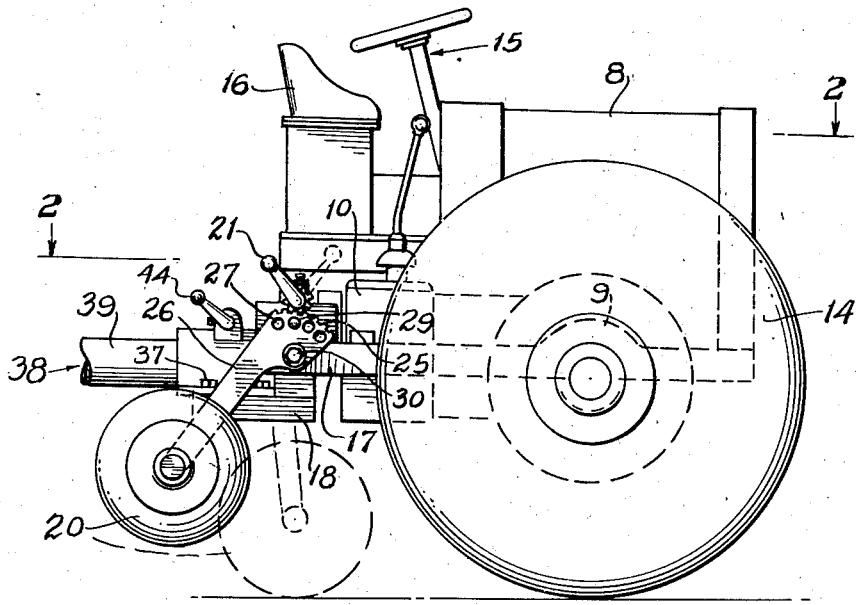
Figure 2:
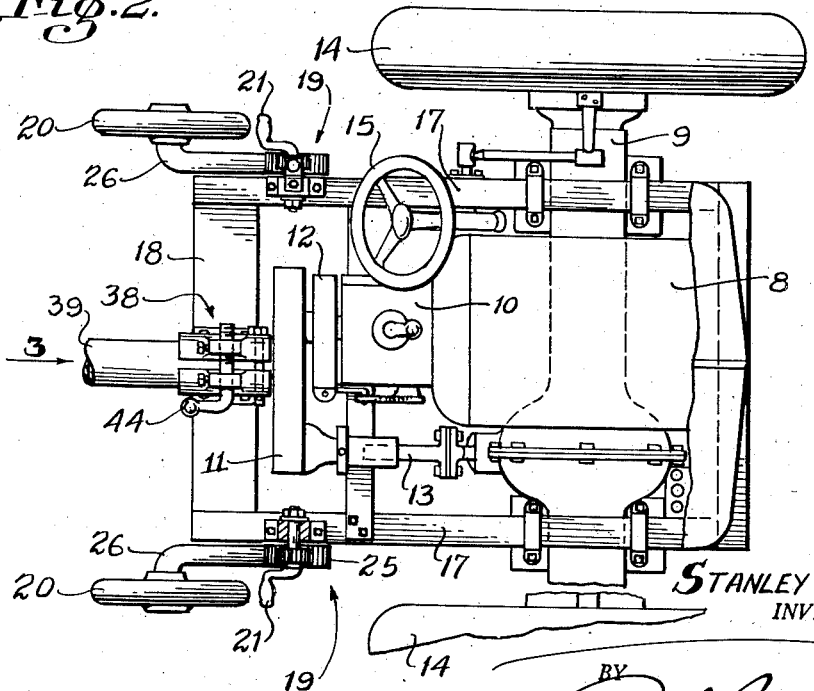
Fig. 2 is a plan view with the seat omitted, certain parts being broken away to contract the view.

In the embodiment of the invention selected for the purpose of disclosure, therein is shown in Figs. 1–3 a tractor body comprising the engine 8 mounted directly over the front axle housing 9, and suitable transmission gearing including the transmission housing 10, transfer case 11, hand brake and drum 12 located between said transmission and transfer case, and a propeller or drive shaft 13 connecting the transfer case and front axle to operate the traction wheels 14. To the left of the engine 8, as viewed in Figs. 1 and 2, is located the steering apparatus 15 in close proximity to the driver's seat 16.

The tractor body includes a supporting frame having side frame members 17 connected at their rear ends by a cross-tie or end frame member 18. To said side frame members, at a point adjacent to the place where the cross-tie and the side frames are joined, is mounted the mechanism 19 for operating the auxiliary rear wheels 20, whereby when the tractor is hitched to a trailing implement by means of the hitch pole 39, said wheels 20 may be elevated to an inoperative position, as shown in Fig. 1, thereby converting the tractor from a four wheel to a two wheel tractor.

Mechanisms 19 are shown each independently operable by means of its crank arms 21 (see Fig. 6) having a shaft portion 22 mounted in a bearing 23 secured to the top side of each said side frame member as shown in plan in Fig. 2. On said shaft portion 22 between said crank arm and bearing is mounted a pinion gear 24 the teeth of which mesh with the teeth of a gear segment 25 forming part of the wheel support 26 for each auxiliary wheel 20 whereby the latter may be adjusted for the purpose desired. In an arcuately, parallel spaced relation to the sector teeth, as seen in Fig. 1, are formed a plurality of holes 27 to receive a bolt for adjusting the wheels in relation to the vertical, a detachable bolt 29 being utilized to hold the wheel 20 in its various, adjusted positions, like holes 28 registering with said holes 27 being formed in said bearing 23 through which the bolt is also projectable. Below said gear segment 25 the wheel support 26 is rounded and laterally deflected into a wheel supporting axle upon which the wheel 20 is mounted. The wheel support is pivotally connected to the frame piece 17 by means of a bolt 30 which is positioned in a concentric relation to the two series of holes 27 and 28.

As best shown in Figs. 3 and 6, a retarding and holding means 31 is provided to releasably maintain the crank operated pinion 24 in its rotationally adjusted position until the bolt 29 has been secured in place. This holding means comprises an angular bracket the foot portion 32 of which is secured to the bearing 23, the upper arm 33 of said bracket overlying the pinion gear 24 and having a vertically movable spring-driven dog 34 journalled in said arm, the lower end of said dog overriding the teeth of the sector 25 when the crank 21 is rotationally adjusted.

The cross-tie piece 18 is mounted in an underslung relation to the rear end of the side frame members 17, this underslung condition being effected by a channel iron member 35 through the medium of a filler block 36 which is interposed between said channel member 35 and frame member 17 at each side of the device. The end portions of the cross-tie 18, as seen in Fig. 3, are dove-tailed into the open sides of the member 35. The channel members 35 and the filler blocks are secured to the under side of the frame members 17 in said underslung condition by any suitable means as, for example, by welding.

To the midwidth portion of the cross-tie piece 18 is secured by means of bolts 37 a means 38 for hitching the implement to be trailed to the tractor. For this purpose a trailing member (not shown), having a round tongue 39, is secured within said hitch means 38. For this purpose there is provided a clamping device shown as consisting of a split bearing having apertured ears 40 to receive a shaft having a screwthreaded portion 41 operatively engaging one of said ears 40, and an annular groove 42 to receive the point portion of a set screw 43 carried by the other ear 40. Said shaft is provided with a crank arm portion 44 so that it may be rotated to cause one of said ears 40 be be adjusted toward and from the other for the purpose of clamping the hitch means 38 to the tongue 39.

In addition to the clamping means which has just been described there is provided additional means for securing the tongue 39 to the hitch, comprising a tie-bolt 45 extending through the already mentioned pair of ears and through the tongue 39. This latter device is provided as a safety means which prevents the implement being trailed from being separated from its hitch even if the clamping means which has been described becomes relaxed.

What is claimed is:

1. A vehicle of the kind described comprising a frame or chassis, an arm pivoted to said frame to swing in a vertical plane, a ground wheel carried by said arm to be swung thereby to and from a ground-engaging position, said arm having a sector with a series of cog teeth arranged concentrically in relation to the axis about which said arm swings, a cog-wheel mounted upon said frame in mesh with the teeth of said sector, means connected with said cog-wheel to turn it in reverse directions to raise and lower said ground wheel, said sector having a series of apertures extending along its arcuated portion and said frame having a series of apertures individually registrable with the first named apertures, and a locking pin insertable through alined apertures of said two series to releasably lock said ground wheel in adjusted positions.

2. A vehicle of the kind described comprising a frame or chassis, an arm pivoted to said frame to swing in a vertical plane, a ground wheel carried by said arm to be swung thereby to and from a ground-engaging position, said arm having a sector with a series of cog teeth arranged concentrically in relation to the axis about which said arm swings, a cog-wheel mounted upon said frame in mesh with the teeth of said sector, means connected with said cog-wheel to turn it in reverse directions to raise and lower said ground wheel, centering means carried by said frame in a position to hold the sector in angular adjustment, locking means operatively related to said frame and sector positively to secure the latter in certain of its angular adjustments, said locking means comprising registrable holes in said frame and sector, and a locking pin insertable into said holes when the latter are brought into register with each other.

3. A tractor of the kind described comprising a frame or chassis, an arm pivoted to each side of said frame to swing in a vertical plane, a ground wheel carried by each said arm to be swung thereby to and from a ground-engaging position, each said arm having a sector with a series of cog-teeth arranged concentrically in relation to the axis about which each said arm swings, a cog-wheel mounted upon said frame in mesh with the teeth of each said sector, means connected with each said cog-wheel to turn it in reverse directions to raise and lower each of said ground wheels, centering means carried by said frame in a position to hold each said sector in angular adjustment, locking means operatively connected to said frame and each said sector to secure the latter in certain of their angular adjustments, said locking means comprising registrable holes in said frame and sectors, locking pins insertable into said holes when the latter are brought into register with each other, and hitch means carried by said frame for detachably connecting to the tractor rearwardly of said ground wheels an agricultural implement to be trailed by said tractor.

4. In a tractor of the kind described, two pairs of ground wheels carried by said tractor, one of said pairs being continuously maintained in a ground-engaging position, means for adjusting the wheels of the other pair to and from a ground-engaging position whereby to convert the tractor from a two wheel tractor when hitched to an implement to a four wheel tractor when unhitched from an implement and vice versa, the latter means comprising an arm pivoted to each side of the tractor to swing in a vertical plane, a sector connected to each of said arms to swing therewith in unison, said sectors being provided with a series of teeth arranged concentrically in relation to the axis about which each of said arms together with said sectors swing, a cog-wheel mounted upon said tractor in mesh with the teeth of each of said sectors, a crank arm connected with each said cog-wheel to turn it in reverse directions, each said sector having a series of apertures extending along its arcuate portion, and said tractor having a series of apertures individually registrable with the first recited apertures, and a locking pin insertable through alined apertures of said two series to releasably lock said adjustable pair of wheels in adjusted positions.

STANLEY BIZJAK.

REFERENCES CITED

The following references are of record in the file of this patent:

UNITED STATES PATENTS

| Number | Name | Date |
|---|---|---|
| 1,698,277 | Ronning et al. | Jan. 8, 1929 |
| 2,158,891 | Beacher | May 16, 1939 |
| 1,113,063 | Spencer | Oct. 6, 1914 |
| 2,247,668 | Rosenthal | July 1, 1941 |
| 2,254,360 | Frudden et al. | Sept. 2, 1941 |
| 1,396,956 | Hawthorne | Nov. 15, 1921 |
| 1,552,929 | Holland-Letz | Sept. 8, 1925 |